April 7, 1964　　　R. P. GEHMAN　　　3,127,728
RAKE TOOTH STRUCTURE
Filed Jan. 25, 1962

INVENTOR
ROLAND P. GEHMAN
BY Joseph A. Brown
ATTORNEY

United States Patent Office 3,127,728
Patented Apr. 7, 1964

3,127,728
RAKE TOOTH STRUCTURE
Roland P. Gehman, Akron, Pa., assignor to Sperry Rand Corporation, New Holland, Pa., a corporation of Delaware
Filed Jan. 25, 1962, Ser. No. 168,722
5 Claims. (Cl. 56—400)

This invention relates generally to rake teeth for raking reels wherein the teeth sweep along the ground to perform their raking operation. More particularly, the invention relates to an improved, rubber mounted, rake tooth structure.

It has been recognized heretofore that connecting a rake tooth to a raking reel through a rubber block affords certain advantages. However, a substantial limitation is cost, and the fact which has to be weighed is whether the added cost is worth the added advantages. A side delivery rake usually has in the vicinity of one hundred rake tines. Even a few cents difference in cost between a coil spring tine and a rubber mounted tine constitutes a substantial amount when multiplied by the number of tines on a rake.

One important object of this invention is to provide a rubber mounted rake tooth structure which can be manufactured at a cost lower than prior designs.

Another object of this invention is to provide a rake tooth structure having components which are easily assembled and locked together by structural means rather than by bonding means as conventionally employed.

Another object of this invention is to provide a rake tooth structure wherein a rake tine is held against axial movement toward a rubber block on which it is mounted.

Another object of this invention is to provide a rake tooth structure of the character described having a support member which is used to connect the structure to a rake bar, means being provided for holding a rubber mounting block of the structure against movement toward the rake bar.

A further object of this invention is to provide a rake tooth structure wherein a support member is so disposed relative to a rake tooth member that the size of a rubber mounting block can be varied as desired to thereby vary the spring rate which the rake tooth will have.

A still further object of this invention is to provide a rake tooth structure which is simple yet rugged whereby it will take a substatnial amount of punishment without damage.

Other objects of this invention will be apparent hereinafter from the specification and from the recital in the appended claims.

Figure 2:
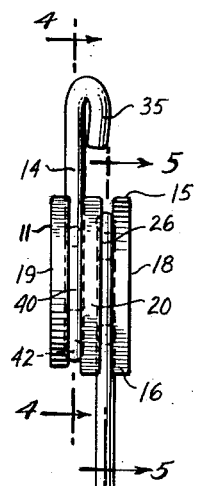
FIG. 2 is a view looking from right to left of FIG. 1, but showing the rake bar removed.
Figure 4:
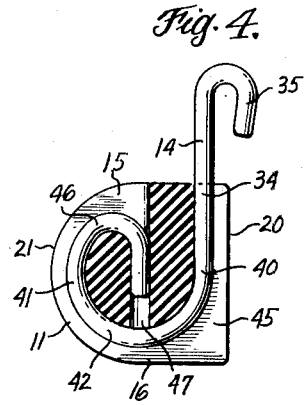
Figure 5:
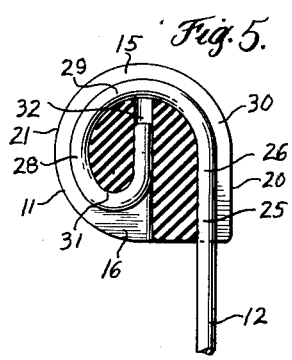
Figure 6:
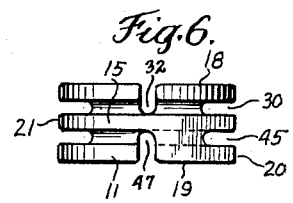
Figure 7:
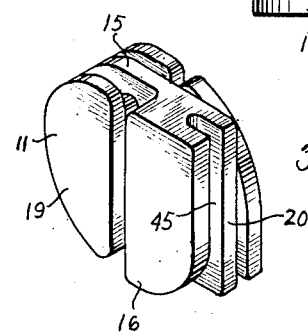

FIGS. 4 and 5 are vertical sections taken on the lines 4—4 and 5—5 of FIG. 2, respectively, looking in the direction of the arrows;

FIG. 6 is a plan view of the rubber mounting block of the structure;

FIG. 7 is a perspective view of the block; and

Figure 8:
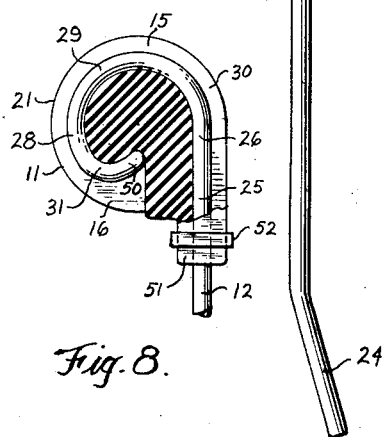

FIG. 8 is a view similar to FIG. 5 and showing a tooth structure manufactured according to another embodiment of this invention.

Referring now to the drawings by numerals of reference, 10 denotes generally a rake tooth structure which comprises a mounting block 11 of rubber or other elastomer material, a rake tooth 12 and a support member 14. The mounting block has a top portion 15, a bottom portion 16, spaced parallel sides 18 and 19, and end portions 20 and 21.

The rake tooth 12 extends downwardly from the lower portion 16 of mounting block 11. The rake tooth has an outer free end 24 and an inner end 25. The inner end is of U-shaped configuration (FIG. 5) having a first leg 26 which extends from the bottom portion 16 of the block 11 to the top portion 15, a second leg 28 which extends from the top portion 15 toward the bottom portion 16, and a bight 29 which connects legs 26 and 28 and extends along top portion 15. Legs 26 and 28 and bight 29 are located in a common plane which is parallel to side wall 18 (FIG. 2) of the mounting block 11. The inner end of the rake tooth 12 is spaced inwardly from side wall 18 and the legs and bight thereof extend through a radially inwardly extending groove 30 formed in block 11. To prevent axial movement of rake tooth 12 toward mounting block 11, leg 28 of the inner end 25 of the rake tooth has a hook portion 31 which engages part of bottom portion 16 of block 11 and extends upwardly into a central passage 32 in the block.

The supporting member 14 (FIG. 4) has a lower end 34 connected to rubber mounting block 11 and an upper end 35 which is hook shaped for connection to rake bar reel 36. The rake bar reel 36 is tubular and the support member 14 is connected thereto by a bolt 37 which passes through the support member upper end 35 and is fastened to the rake bar by a nut 38. The lower end 34 of the support member has a first arm 40 which extend downwardly from top portion 15 of mounting block 11 toward bottom portion 16 of the block. It has a second arm 41 which extends from bottom portion 16 toward top portion 15. Arms 40 and 41 are interconnected by a bight 42, and these parts are located in a common plane adjacent but spaced inwardly from the side wall 19 of mounting block 11. Likewise, these arms and bight extend parallel to side 19 and to the inner end 25 of the rake tooth 12.

Figure 3:
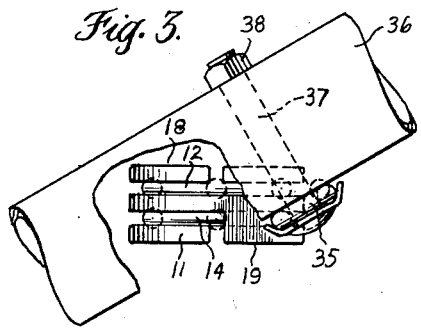
FIG. 3 is a plan view of FIG. 1.

As shown best in FIGS. 2 and 3, the upper end 35 of the support member 14 extends diagonally inwardly relative to side wall 19 of the rubber block 11. This diagonal extension insures that when the rake tooth structure 10 is fastened to the rake bar 36, the mounting block 11 and the structural components of the rake tooth will extend diagonally relative to the axis of the rake bar 36. This is done to properly orient rake tooth 12 relative to the rotating raking reel of which the rake bar 36 is a part. Specifically, the rake tooth is located to extend in proper direction relative to the sweep of the tooth during a raking stroke.

The lower portion 34 of support member 14 extends through a groove 45 formed in the mounting block 11 and the terminal end of the arm 41 has a hook portion 46 which engages top portion 15 of mounting block 11 to thereby hold the block against movement toward the rake bar 36. Hook 46 extends into the center of block 11 through a passage 47.

Figure 1:
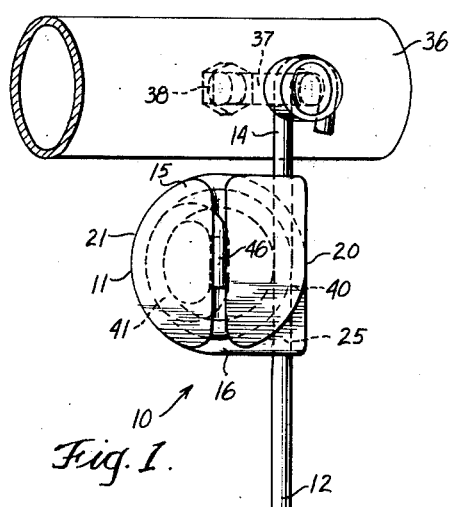
FIG. 1 is a side elevation of a rake tooth structure fabricated according to this invention and fastened to a rake bar.

With the structure described, rake tooth 12 is held against longitudinal movement toward mounting block 11 by hook 31. The rake tooth and the mounting block 11 are held against movement toward rake bar 36 by the hook 46 on support member 14. When the rake tooth 12 strikes an obstacle, on a sweeping stroke left to right of FIG. 1, the tine will pivot in a clockwise direction when viewed as shown in FIG. 1. Torque forces will be applied to mounting block 11. The spring rate of tooth 12 can be varied by the amount of the rubber employed in the block 11 and particularly by the amount of spacing between the inner end 25 of rake tooth 12 and the lower end 34 of the supporting member 14.

The structure described is capable of being manufactured at low cost. The block 11 can be molded or otherwise preformed to provide the necessary passages or grooves for the legs and arms of the rake tooth metal components. In assembling the parts, the inner end 25 of tooth 12 can be placed against side wall 18 and pressed onto rubber block 11. In like respect, the lower end 34 of support member 14 can be placed against the side 19 and then pressed onto the block.

The rake tooth 12 and support member 14 are connected to the rubber block 11 by structural means rather than bonding means as conventionally employed. The three components, namely tooth 12, member 14 and block 11, can be manufactured separately and then quickly and easily assembled. The design is subject to mass production at a low unit cost.

Referring now to FIG. 8, there is shown a tooth structure of modified design. A modified inner end of rake tooth 12 is shown, parts the same as those previously described bearing like numerals and changed parts bearing new numerals. Instead of the hook on leg 28 projecting deeply into the center of block 11, a stubby, hooked end 50 may be provided, thereby eliminating passage 32 and increasing the amount of rubber in the mounting block. Further, the lower portion 16 of the mounting block has a downwardly extending neck 51 which partially surrounds the shank of tooth 12. A retainer ring 52 will aid in locking tooth 12 in groove 30. Although not shown, it will be apparent that the lower end 34 of support member 14 can also be constructed as shown in FIG. 8.

While this invention has been described in connection with two embodiments thereof, it will be understood that it is capable of further modification, and this application is intended to cover any variations, uses, or adaptations following, in general, the principles of the invention and including such departures from the present disclosures as come within known or customary practice in the art to which the invention pertains, and as fall within the scope of the invention or the limits of the appended claims.

Having thus described my invention what I claim is:

1. A rake tooth structure for mounting on a rake bar comprising a grooved mounting block of elastomer material having a top portion, a bottom portion, a pair of spaced sides and a pair of end walls, a rake tooth extending from said bottom portion and having an upper end detachably connected to said block and an outer free end remote therefrom, said upper end being generally U-shaped and having a first leg integral with the rake tooth and extending from said bottom and toward said top portion, a second leg extending from said top portion to said bottom portion, and a bight connecting said legs and extending along said top portion, said second leg having a free end opposite said bight, means on said second leg free end engaging the bottom portion and holding the rake tooth against movement in a direction toward said block, said upper end being located adjacent and inwardly of one of said pair of sides and said legs in their entireties being located in grooves of said block and spaced inwardly from said end walls, and means separate from said rake tooth and connected to the other of said sides for fastening the block to the rake bar.

2. A rake tooth structure for mounting on a rake bar comprising a grooved mounting block of elastomer material having a top portion, a bottom portion, a pair of spaced sides, and a pair of end walls, a rake tooth extending from said bottom portion and having an upper end detachably connected to said block and an outer free end remote therefrom, said upper end being generally U-shaped and having a first leg integral with the rake tooth extending from said bottom toward said top portion of the block, a second leg extending from the top to said bottom portion and a bight connecting said legs and extending along said top portion, said second leg having a free end opposite said bight, said first and second legs and said bight being located in a common plane adjacent and inwardly of one of said sides and said legs in their entireties being located in grooves of said block and spaced inwardly from said end walls, a support member extending outwardly from said top portion and having a lower end connected to said block and an upper end remote therefrom, said lower end being generally U-shaped and having a first arm integral with the support member extending from said top to said bottom portion of the block, a second arm extending from the bottom and to the top portion, and a bight connecting the arms extending along the bottom portion, said second arm having a free end opposite said bight, said first and second arms and said bight of said lower end being located in a common plane adjacent and inwardly of the other of said sides and spaced laterally from the inner end of the rake tooth and said arms in their entireties being located in grooves of said block and spaced inwardly of said end walls, and means for fastening said support member upper end to the rake bar.

3. A rake tooth structure as recited in claim 2 wherein a hook is provided on said free end of the second leg of the rake tooth inner end and engaging said bottom portion to hold the rake tooth against movement toward said block.

4. A rake tooth structure as recited in claim 2 wherein said legs and bight of said rake tooth inner end extend through inwardly extending grooves in the block, means being provided to prevent movement of the inner end outwardly of said grooves.

5. A rake tooth structure as recited in claim 2 wherein said movement preventing means comprises a neck on said block projecting along the rake tooth and a ring around said neck and said rake tooth.

References Cited in the file of this patent

UNITED STATES PATENTS 2,328,121    Bartek _____ Aug. 31, 1943